3,833,741
BAKERY PRODUCTS CONTAINING HEAT STABLE FOOD FILLINGS

Morris H. Katz, Minneapolis, and Jack R. Durst, Champlin, Minn., assignors to The Pillsbury Company, Minneapolis, Minn.
No Drawing. Filed Oct. 18, 1972, Ser. No. 298,733
Int. Cl. A21d 13/00; A23g 3/00
U.S. Cl. 426—94
7 Claims

ABSTRACT OF THE DISCLOSURE

A solid or semisolid flavored filling for bakery products which resists flow upon being heated is composed of a homogeneous external polar phase having a pH range of from about 3.2 to 5.4 and optionally an internal phase of minute fat globules in the amount ranging from about 5 to 75 parts by weight encapsulated within the external polar phase. The external phase contains about 100 parts by weight of water and from about 5 to 35 parts by weight of an edible protein to provide resistance to flow upon heating, an edible saccharide and a minor amount of flavoring. The edible protein is in the amount of from about 2 to 35% by weight and optionally gelatin or egg albumin each in amounts up to about 10 parts by weight.

The Prior Art

A great many food fillings such as fruit, custard fillings and cheese fillings have been previously used in bakery goods. A marked shortcoming of these products is their lack of resistance to flow when baked or heated. The problem is especially serious if the dough product is not completely sealed so that during the baking process the cheese or fruit filling runs out of the product. This produces a void, and usually causes the filling to become burned when it comes in contact with the surface of the baking pan.

Summary of the Invention

The invention provides a fabricated flavored food filling which may have a cheese, fruit or other flavor and is adapted to be heated or baked with bread, biscuit dough or other bakery products having a cereal flour base to provide a baked crumb structure, the filling resists flow upon heating. It consists essentially of a homogeneous external phase having a pH ranging from about 3.2 to 5.4 and optionally an internal phase of minute fat globules in an amount ranging from between 5 and 75 parts by weight encapsulated by the external phase. The external phase contains about 100 parts by weight of water and edible protein. The edible protein comprises a coagulated caseinate selected from sodium caseinate, potassium caseinate and ammonium caseinate or a combination thereof with sodium caseinate to provide enough of the non-calcium ions to give the caseinate film forming properties or whole milk protein including lactalbumin, non-fat milk solids, soy protein, cottonseed protein, peanut protein, sunflower protein or other edible vegetable proteins and combinations thereof. The proteins should be present in an amount ranging from about 2 to about 35 parts by weight. If gelatin is used, it is used in amounts ranging from 0 to about 10 parts by weight and egg albumin, when used, is used in amounts ranging from 0 to about 10 parts by weight. A saccharide is used in a minor amount. It can comprise any of the edible saccharides such as sucrose, where sweetness is desired, or amorphous sugars, such as corn syrup solids where less sweetness is desired. The edible saccharide is usually used in amounts ranging from about 2 to about 40 parts by weight and preferably 15 to 25 parts by weight together with flavoring as desired. A small amount of other edible hydrocolloid in addition to the protein can be added as a viscosity control agent, any of a variety of hydrocolloids can be used including many of the edible food-grade gums, starches, starch derivatives or other hydratable carbohydrates. One preferred carbohydrate is a gelatinized starch in the amount of about 2 to 5 parts for each 100 parts of water.

The Preferred Embodiment

In accordance with the present invention, fillings for bakery products and pastries such as fruit or cinnamon flavored fillings as well as cheese and other flavored fillings are converted from a dimentionally unstable product which flows upon being heated to a stable form that resists flowing when heated. The fillings optionally include two phases, a dispersed phase of relatively small fat globules suspended in a polar matrix composed of protein, water, a saccharide typically either mono or disaccharide and optionally a small amount of starch and a flavoring. The filling is enclosed in cereal flour based bakery goods.

Certain edible proteins are especially suitable for use in the invention. Preferred edible proteins include a caseinate selected from sodium caseinate, potassium caseinate and ammonium caseinate or a combination thereof with sodium caseinate to provide enough of the non-calcium ions to give the caseinate film forming properties or whole milk protein including lactalbumin, non-fat milk solids, soy protein, cottonseed protein, peanut protein, sunflower protein or other edible vegetable proteins and combinations thereof. The protein should be present in amount ranging from about 2 to 35 parts by weight to each 100 parts of water. It was surprising to find that these proteins in the amount disclosed, render the composition heat stable. In a typical composition, 20 parts of sodium caseinate are used for each 100 parts of water. The protein is thoroughly dispersed in the water and hydrated to form a gel which is preferably done by heating the water prior to mixing but not sufficient to denature or coagulate any of the protein present. The oil can be added and dispersed as a discontinuous phase either prior to or after the addition of protein.

A variety of other food proteins can be used such as gelatin or egg albumin. It was surprising to find that gelatin although it is a non-coagulable protein was effective in adding to the heat stability of the filling when used in conjunction with caseinate or other designated protein in amounts ranging from about half the amount of caseinate or other protein present to an amount about equal to the amount of caseinate present. When egg albumin is used, it is used in the amount of about ⅓ the amount of caseinate or other protein present to about equal the amount of caseinate or other protein present. It was surprising to find that gelatin when it is used in conjunction with caseinate or other protein, adds considerably to the gumminess of the composition which is desirable to some situations. On the other hand, if gumminess is to be reduced, egg albumin can be added or the amount of gelatin reduced. For example, when 11.5 parts of protein are used for each 40 parts of water and about 3 parts of egg albumin are used for each 8 parts of caseinate, the gumminess factor is only about 600 whereas when 10 parts of protein is used of which 30% is gelatin, the gumminess factor is about 1700 or 3 times that in the case of egg albumin.

In order to have the proper dimensional heat stability, I have found that the pH should range from between about 3.2 and 5.4. If the pH is either above or below this range, the viscosity of the filling upon being heated will be too low.

The present invention is particularly useful in preparing heat stable cheese substitute which resembles cured cheese foods such as cheddar or American, brick, Swiss, mozzarella, etc. as well as the processed cheeses but will withstand baking temperatures of dough without deforming due to the excessive melting or running and without the development of a curdled or gritty texture and without the release of visable or free fat globules. This product preferably contains from about 30 to 75% moisture and either liquid or solid fat as the fatty component, a protein and a non-protein hydrocolloid. The heat and textural stability are achieved by adjustment of the hydrocolloid content solubility and viscosity and by adjustment of the following conditions: the protein type and solubility, specific ion complexes, such as the presence of heavy metal ions for viscosity control and heat denaturation control of proteins by adjustment of pH and specific ion complexing followed by heating. While stabilizing salts such as sodium citrate or sodium phosphate or both have been used to obtain a smooth non-curdling meltable cheese, these foods are generally adjusted to a pH of about 5.8 to 6.5 or somewhat above the isoelectric point of casein (about 4.6). In accordance with the present invention, the melting property of the protein is minimized by adjusting the pH of the composition to say 4.9 in the case of the cheese product, just slightly higher than the isolectric point of casein.

Specific ions like citrates or phosphates are used with proteins such as caseinate to minimize heat denaturation with the curdled or gritty textural result. These are generally used as sodium salts to adjust the pH. Other heavy metal ions such as calcium are used to develop gel and viscosity of hydrocolloid gums such as alginate or carrageenin. Other hydrocolloids whose gelation or viscosity is a function of acidity are illustrated by pectin which requires an acid medium to develop a gel.

In the case of the cheese product, it is preferred to use for each 100 parts by weight of water an edible protein including caseinate with the total protein amounting to between 15 and 25 parts of which caseinate comprises at least about 2 parts and the balance comprises either gelatin, egg albumin or both. The caseinate is selected from sodium caseinate, potassium caseinate and ammonium caseinate or a combination thereof with sodium caseinate to provide enough of the non-calcium ions to give the caseinate film forming properties.

One preferred oil is vegetable oil such as Durkex 500 manufactured by Durkee Famous Foods of Cleveland, Ohio. The preferred amount of oil is between about 30–40 parts.

Among the suitable food acids are citric acid, malic acid, lactic acid, phosphoric acid or adipic acid. These can be used in the total amount of about 1 to 2 parts by weight to bring the pH into the desired range.

Hydrocolloids used for thickening the polar phase include any of the edible food gums, starches, starch derivatives such as hydrolysates and the like which are used for thickening as well as food gums and cellulose derivatives including methyl cellulose, carboxy methyl cellulose and the like or other edible carbohydrates. Only a small amount is used. For example, when gelatinized starch is used, it is preferably used in the amount of about 2–10 parts by weight.

In cheese products the saccharide preferably comprises one with a low sweetening power such as corn syrup solids or a product such as hydrolysate of starch in which the Dextrose Equivalent is less than 20, e.g., "Mor-Rex" which is manufactured by CPC International of Englewood Cliffs, N.J.

The saccharide is present in the amount of about 15–25 parts. Cheese such as Romano cheese can be used for flavoring as well as cheese flavors and the like. If Romano cheese is used, it is used in the amount of about 10–20 parts by weight. The balance of the composition comprises a minor amount of color and flavor.

Cheese filling of the best consistency and flow characteristics as ascertained by the heat stability test mentioned in column 4 followed by subjecting the results to regression analysis have a Y value (deformation) for a given composition of at least 1.25 but less than 1.5 in the following equation:

$$Y = 1.389 \frac{+0.153W}{+0.007PE} - .322P - .092E - 0.086WP - .177WG + 0.034Pz$$

wherein W represents the weight ratio of water to shortening, P represents the total caseinate, albumin and gelatin weight to water weight ratio, E is the weight ratio albumin weight to the total weight of albumin, caseinate and gelatin contained in the cheese product, G represents the weight ratio of the weight of gelatin to the total weight of gelatin, albumin and caseinate contained within said synthetic cheese product.

When the filling is to have a cheese flavor, it preferably contains about equal amounts of all three of the preferred proteins, egg albumin, sodium caseinate and gelatin together with corn syrup solids or other amorphous sugar as the only saccharide present. Typically, a minor amount of cheese flavor or a cheese such as Romano cheese e.g., 7 parts for every 10 parts of protein is used for flavoring.

There is no objection to using a variety of different methods for forming the dispersion of oil in the aqueous matrix provided the method of making the emulsion results in a finished product which retains the oil globules in a stable form. The need to prepare an oil-starch protein dispersion before adding the product to the final mixer is preferred because of the concern for forming a good dispersion of the finite particles of the dry starch-protein-hydrocolloids in oil to facilitate the formation of a hydrocolloid film around the globules. It also helps to prevent lumps and maximizes surface exposure to help develop a hydrated film. A mixer such as a Waring Blendor can be used or any of a variety of corresponding production size high speed, high shear mixers provided they make possible sufficient mixing so that the dispersion will withstand a stability test conducted by placing a small amount of the dispersion in a beaker of hot water and observing for the absence of free oil separation.

While the pH of the finished product as mentioned above is between 3.2 and 5.4, when using an acid curd (dry curd cottage cheese) the cheese can be solubilized by the addition of an ingredient such as trisodium phosphate to raise the pH to 6.0 prior to mixing with the other ingredients. When this is done the trisodium phosphate produces a heat stable and soluble caseinate analogous to sodium caseinate. This helps to make the cottage cheese curd and Romano cheese heat stable and to facilitate the solution of the cheeses with the other hydrocolloids so as to avoid heat denaturation or curdling which results in a gritty product. Reducing the buffer capacity of the bakers cheese curd by washing the curd would minimize the amount of trisodium phosphate needed to achieve a pH of 6.0. The pH is then reduced by the addition of a suitable food acid.

Heating of the cheese portion for pasturization and to facilitate mixing prior to mixing with the hydrocolloid is a preferred method of mixing. When this is done, the fatty component in the formulation is heated to 185° F. to solubilize the cheese proteins to facilitate blending them with other hydrocolloids. It should be noted that the cheese curd itself functions as a hydrocolloid. Accordingly, heating must be done at a pH where the protein is not subjected to heat denaturation.

In one preferred procedure, the gelatin and seasoning such as mustard flour is dispersed in water and heated to 110 to 120° F. The other proteins (sodium caseinate and egg albumin) are dispersed in the oil as dry solids using a small high shear mixer such as a Waring Blendor. The two mixtures are then combined and placed in a high shear mixer and mixed until a stable dispersion forms. The remaining ingredients such as the fat, acid, salts, starch, saccharides and other flavors are then added and mixed until a uniform dispersion results (about 5 minutes).

Among the other flavors that can be used are custard, jam or jelly of any fruit, cinnamon, chocolate and the like. The filling can also be given a meat or pizza flavor if desired.

As mentioned above the resistance to flow upon heating is controlled by a balance of several factors. To be considered heat stable the sample is baked in an oven at 375° F. for 10 minutes (a sample measuring 1" x ½" x ¼" is used), i.e., it expands from 125% to 150% of its original length. Expansion due to flow should be between 1¼" and 1½".

Compositions are made having the formulations shown in Tables I, II and III.

TABLE I

| Example | 2 | 5 | 8 | 11 |
|---|---|---|---|---|
| Egg albumin |  | 2.32 |  | 2.09 |
| Na caseinate | 10.79 | 5.68 | 7.10 | 3.02 |
| Gelatin |  |  | 2.90 | 2.09 |
| Durkex 500 | 13.93 | 13.93 | 15.03 | 15.03 |
| Glycerine | 4.30 | 3.10 | 4.00 | 2.87 |
| Citric acid | .058 | .043 | .054 | .039 |
| Salt | 1.95 | 1.95 | 1.95 | 1.95 |
| Starch (Gelatinized) | 2.64 | 2.64 | 2.64 | 2.64 |
| Corn syrup solids | 18.876 | 23.064 | 18.922 | 22.987 |
| Romano cheese powder | 6.200 | 6.20 | 6.20 | 6.20 |
| Mustard flour | .400 | .40 | .40 | .40 |
| Lactic acid (88%) | .71 | .527 | .658 | .538 |
| Butter flavor | .030 | .03 | .03 | .03 |
| FDC Yellow #6 (4% soln.) | .085 | .085 | .085 | .085 |
| FDC Yellow #5 (4% soln.) | .061 | .061 | .061 | .061 |
| Water | 39.970 | 39.970 | 39.970 | 39.970 |
| Total | 100.00 | 100.00 | 100.00 | 100.00 |

Using response surface analysis of the performance values for such formulations in Table III, the values for Tables I and II were developed. The examples numbered 2, 5, 8, and 11 of Table I correspond to the same formulation numbers in Table II. The water to shortening ratio was varied, the protein to water ratio was varied and the amount of the three different proteins was varied all as shown in Table II below. Each of the compositions exhibit flow characteristics within the acceptable range of 1.25 to 1.50 set forth when it is heated under the conditions specified herein.

TABLE II

| Example | Water/shtng. | Protein/water | Percent Water | Caseinate | Gelatin | Egg | Firmness[1] | Cohesiveness[1] | Chewiness[1] | Gumminess[1] |
|---|---|---|---|---|---|---|---|---|---|---|
| 1 | 1.62 | .13 | 39.97 | 5.2 | 0 | 0 | 307 | .22 |  |  |
| 2 | 2.87 | .27 | 39.97 | 10.79 | 0 | 0 | 2,717 | .06 |  | 263 |
| 3 | 3.90 | .34 | 39.97 | 13.59 | 0 | 0 | 2,010 | .12 |  | 162 |
| 4 | 1.83 | .06 | 39.97 | 1.70 | 0 | .69 | 536 | .54 | 38 | 196 |
| 5 | 2.87 | .20 | 39.97 | 5.68 | 0 | 2.32 | 2,676 | .39 | 46 | 583 |
| 6 | 3.90 | .29 | 39.97 | 8.23 | 0 | 3.36 | 1,969 | .43 | 49 | 604 |
| 7 | 1.42 | .25 | 39.97 | 7.10 | 2.90 | 0 | 4,651 | .49 | 173 | 1,723 |
| 8 | 2.66 | .25 | 39.97 | 7.10 | 2.90 | 0 | 5,354 | .31 | 168 | 1,554 |
| 9 | 3.90 | .25 | 39.97 | 7.10 | 2.90 | 0 | 4,071 | .32 | 161 | 1,230 |
| 10 | 1.42 | .18 | 39.97 | 3.02 | 2.09 | 2.09 | 2,460 | .38 | 79 | 828 |
| 11 | 2.66 | .18 | 39.97 | 3.02 | 2.09 | 2.09 | 2,768 | .22 | 67 | 717 |
| 12 | 3.90 | .18 | 39.97 | 3.02 | 2.09 | 2.09 | 1,090 | .26 | 54 | 450 |

[1] Terms are defined in *Texture of Semi-Solid Foods: Sensory and Physical Correlates* from *Journal of Food Science*, Volume 36, 1971, pages 155–161.

NOTE.—Width of these products upon heating can be expected to lie within the range of 1¼" to 1½"

The cohesiveness of the finished products (a measure of internal strength) varies from about .06 to about .50. The amount of cohesiveness desired will vary for the particular flavor filling. Chewiness, which is a measure of both strength and cohesiveness varies from about 38 to 170 and gumminess which varies from about 160 to 1700 with larger values indicating increasing gumminess, is a measure of stickiness and the tendency of the product to string out upon being pulled apart.

From Table II it can be seen that caseinate, e.g., sodium caseinate, can be used alone or in combination with other proteins. When used alone, it can be used in amounts as small as from about 5 parts for each 40 parts of water. In combination with other gums it can be used in amounts as small as about 1.7 parts for each 40 parts of water. The greatest amount used in this series is about 13.6 parts for each 40 parts of water. Gelatin and egg albumin should be used in combination with caseinate as seen in the table. They are generally used in substantially smaller amounts than the amount of caseinate. The amount of gelatin can vary from about half the amount of caseinate to about ⅔ the amount of caseinate present. When gelatin is the only protein used with caseinate, it produces a product which is gummy and chewy. When all three proteins are used together the cohesiveness is equal or somewhat greater than when only caseinate is used. The gumminess factor may be 2 to 4 times as great.

It can be seen that while the presence of these proteins is not essential, using more than one protein makes it possible to tolerate greater amounts of moisture. The albumin is especially good at providing greater moisture tolerance but is relatively expensive. Gelatin is not a heat coagulable protein and accordingly would not be expected to act as a heat stabilizing ingredient but is surprisingly effective in this regard. Thus as seen in the table, the amount of cohesiveness is only .06 with caseinate used in the amount of 10.79 parts but when 10 parts of protein including 2.9 parts of gelatin is used, the cohesiveness factor is increased to .49 although the protein to water ratio is about the same. Gelatin is the only non-heat coagulable protein used. It is important to use the protein in uncoagulated form and to prevent coagulation until the dispersion is formed, at which time coagulation is carried out by changing the pH. This appears to help set the fat globules in a coagulated protein sheath.

In a typical commercially available cheese, the milk protein is present in the amount of 25% to 32% of the solids, fat makes up about 37%. For a cheese food product resembling processed brick cheese, moisture is about 33%, protein about 19% and fat about 24%. For a spread, the moisture can be about 49%, protein about 16%, and fat about 21%.

By contrast, the finished product prepared in accordance with the present invention resembles processed cheese but has a much higher moisture content; about 50%. About 13% is protein, about 19% is fat, about 2.6% is cooked starch and about 2.5 parts is corn syrup solids. In a typical cinnamon flavored pastry, filling moisture is about 50%, protein about 9% and fat 11% and saccharides about 20%.

The pH is preferably adjusted to from 3.2 to 3.5 for fruit fillings but is preferably somewhat higher e.g., from 4.0 to 5.4 in the case of cheese fillings. If the pH is increased to as high as 5.8 or more, I have found that the composition will become runny primarily because of the increased solubility of the protein.

The heat stable fillings of the invention other than cheese, can be used in coffee cakes, muffins, breads, biscuits, cookies and related food items and can be inserted before baking. The filling can be made, as mentioned above, in a variety of flavors such as cinnamon, vanilla, custard, chocolate, maple, and various fruits either with or without particles of fruit or whole berries. The texture can be varied from a soft custard type texture to a fairly firm cheese type texture by adjusting the amounts of the several components. The foods will withstand baking temperatures of the dough without excessive running and will resist the development of a curdled or gritty texture as well as the release of visible free fat globules.

The invention will be better understood by reference to the following additional examples:

TABLE III

| Example | 13 | 14 | 15 | 16 | 17 | 18 |
|---|---|---|---|---|---|---|
| Ingredients, percent by wt.: | | | | | | |
| Egg albumin | 2.25 | 1.41 | 1.010 | 1.630 | .750 | 3.750 |
| Sodium caseinate | 10.50 | 7.97 | 4.720 | 7.630 | 10.500 | 10.500 |
| Gelatin | 2.25 | | 1.010 | 1.630 | 3.750 | .750 |
| Vegetable oil | 16.52 | 17.62 | 23.730 | 13.970 | 14.100 | 14.100 |
| Glycerine | 3.51 | 3.74 | 5.100 | 2.960 | 3.000 | 3.000 |
| Citric acid | .05 | .05 | .070 | 0.40 | .040 | .040 |
| Salt | 1.95 | 1.95 | 1.950 | 1.950 | 1.950 | 1.950 |
| Starch (gelatinized) | 2.564 | 2.564 | 2.564 | 2.564 | 2.564 | 2.564 |
| Corn syrup solids | 8.442 | 10.3388 | 18.9835 | 5.2844 | 5.1275 | 5.1275 |
| Romano cheese powder | 6.200 | 6.200 | 6.200 | 6.200 | 6.200 | 6.200 |
| Mustard flour | .400 | .400 | .400 | .400 | .400 | .400 |
| Lactic acid (88%) | 1.248 | .7312 | .3865 | 1.0756 | 1.4625 | 1.4625 |
| Butter flavor | .030 | .030 | .030 | .030 | .030 | .030 |
| 4% soln. FDC Yellow #6 | .085 | .085 | .085 | .085 | .085 | .085 |
| 4% soln. FDC Yellow #5 | .061 | .061 | .061 | .061 | .061 | .061 |
| Water | 43.94 | 46.850 | 33.700 | 54.490 | 49.980 | 49.980 |
| Total | 100.00 | 100.00 | 100.00 | 100.00 | 100.00 | 100.00 |

What is claimed is:

1. A flour based bakery product comprising a baked crumb structure having a cereal flour base and a solid fabricated flavored food filling contained therein which is resistant to running upon being heated, said filling consisting essentially of a homogeneous external polar phase having a pH in the range of about 3.2 to 5.4 and an internal phase of minute fat globules in the amount ranging from about 25 to 75 parts by weight uncapsulated by the external polar phase, said external phase containing about 100 parts by weight of water and an edible protein to provide resistance to flow upon being baked in an oven at 375° F. for 10 minutes so that spreading is within the range of from 125% to 150%, the edible protein being present in the amount of from about 2 to 35% by weight, an edible saccharide and a minor amount of a flavoring.

2. A flour based bakery product comprising a baked crumb structure having a cereal flour base and a solid fabricated cheese flavored filling contained therein which is resistant to running upon being heated, said filling consisting essentially of a cheese flavoring, a homogeneous external polar phase having a pH in the range of about 4.0 to 5.4 and an internal phase of minute fat globules in the amount ranging from about 25 to 75 parts by weight encapsulated by the external polar phase, said external phase containing about 100 parts by weight of water and from about 2 to 35 parts by weight of an edible protein to provide resistance to flow upon being heated so that spreading is within the range of from 125% to 150%, upon baking in an oven at 375° F. for 10 minutes, the edible protein consisting of a member selected from the group consisting of coagulated caseinate selected from the group consisting of sodium caseinate, potassium caseinate, ammonium caseinate and calcium caseinate with sufficient amount of sodium, potassium, or ammonium ions to provide the caseinate with film forming properties, an edible saccharide and a minor amount of a flavoring.

3. A flour based bakery product comprising a baked crumb structure having a cereal flour base and a solid fabricated fruit flavored filling contained therein which is resistant to running upon being heated, said filling consisting essentially of a fruit flavoring, a homogeneous external polar phase having a pH in the range of about 3.2 to 3.5 and an internal phase of minute fat globules in the amount ranging from about 25 to 75 parts by weight encapsulated by the external polar phase, said external phase containing about 100 parts by weight of water and from about 2 to 35 parts by weight of an edible protein to provide resistance to flow upon being heated so as to limit spread within the range of from 125% to 150%, the edible protein comprising a coagulated caseinate selected from the group consisting of sodium caseinate, potassium caseinate, ammonium caseinate and calcium caseinate with sufficient amount of sodium caseinate, potassium caseinate, ammonium caseinate and calcium caseinate with sufficient amount of charide and a minor amount of a flavoring.

4. A flour based bakery product comprising a baked crumb structure having a cereal flour base and a solid fabricated cheese flavored filling contained therein which is resistant to running upon being heated, said filling consisting essentially of a cheese flavoring, a homogeneous external polar phase having a pH in the range of about 4.0 to 5.4 and an internal phase of minute fat globules in the amount ranging from about 35 to 45 parts by weight encapsulated by the external polar phase, said external phase containing about 100 parts by weight of water and from about 2 to 35 parts by weight of an edible protein to provide resistance to flow upon being heated to limit spread within the range of from 125% to 150%, the edible protein comprising a coagulated caseinate selected from the group consisting of sodium caseinate, potassium caseinate, ammonium caseinate and calcium caseinate with sufficient amount of sodium, potassium, or ammonium ions to provide the caseinate with film forming properties, an edible starch in the amount ranging from about 2 to 8 parts by weight, said saccharide comprises about 2 to 8 parts of amrophous sugar.

5. The composition of claim 4 wherein said protein comprises said caseinate and a quantity of a food protein selected of the group consisting of gelatin and egg albumin.

6. The composition of claim 5 wherein the gelatin and egg albumin are used in an amount of from about half the amount present of caseinate to about 1⅓ the amount of caseinate present.

7. A bakery product comprising a cereal flour based bakery product having a flavored filling having a controlled rate of flow upon heating to provide resistance to flow upon being baked in an oven at 375° F., for 10 minutes so that spreading is within the range of from 125% to 150%, said filling consisting essentially of a homogeneous external phase having a pH ranging from about 3.5 to 5.4 and an internal phase of minute fat globules in an amount ranging from 0 to 75 parts by weight of the filling encapsulated by the external phase, said external phase containing 100 parts by weight of water and from about 15 to 22 parts by weight of edible protein comprising a coagulated caseinate selected from the group consisting of sodium caseinate, potassium caseinate, ammonium caseinate and calcium caseinate with sufficient amount of sodium, potassium or ammonium ions to provide the caseinate with film forming properties, a liquid or solid fat present in the amount of between about 25 to 50 parts by weight, at least one food acid sufficient to bring the pH within the range stated, a minor amount of an edible hydrocolloid to thicken the external phase, between about 15 to 25 parts of an edible saccharide and a minor amount of flavoring.

References Cited

UNITED STATES PATENTS

| | | | |
|---|---|---|---|
| 2,015,257 | 9/1935 | Clickner | 426—152 X |
| 2,836,498 | 5/1958 | Fennema | 426—94 |
| 3,366,484 | 1/1968 | Weiss et al. | 426—94 |

RAYMOND N. JONES, Primary Examiner

U.S. Cl. X.R.

426—98, 103, 186, 211, 212, 213

UNITED STATES PATENT OFFICE
CERTIFICATE OF CORRECTION

Patent No. 3,833,741     Dated September 3, 1974

Inventor(s) Morris H. Katz et al.

It is certified that error appears in the above-identified patent and that said Letters Patent are hereby corrected as shown below:

Column 4, line 6 in the equation the term is "$0.034P^2$"

In Table III, Example 16, the sixth item should be -- .040 --, rather than "0.40". Claim 3, column 8, line 30, after "sufficient amount of" cancel the remaining portion of the claim and insert the following -- sodium, potassium, or ammonium ions to provide the caseinate with film forming properties, an edible disaccharide and a minor amount of a flavoring. --.

Signed and sealed this 19th day of November 1974.

(SEAL)
Attest:

McCOY M. GIBSON JR.       C. MARSHALL DANN
Attesting Officer      Commissioner of Patents